No. 888,294. PATENTED MAY 19, 1908.
W. B. AFFLECK.
TABLE FOR MEAT, SAUSAGE, AND THE LIKE.
APPLICATION FILED MAY 28, 1907.
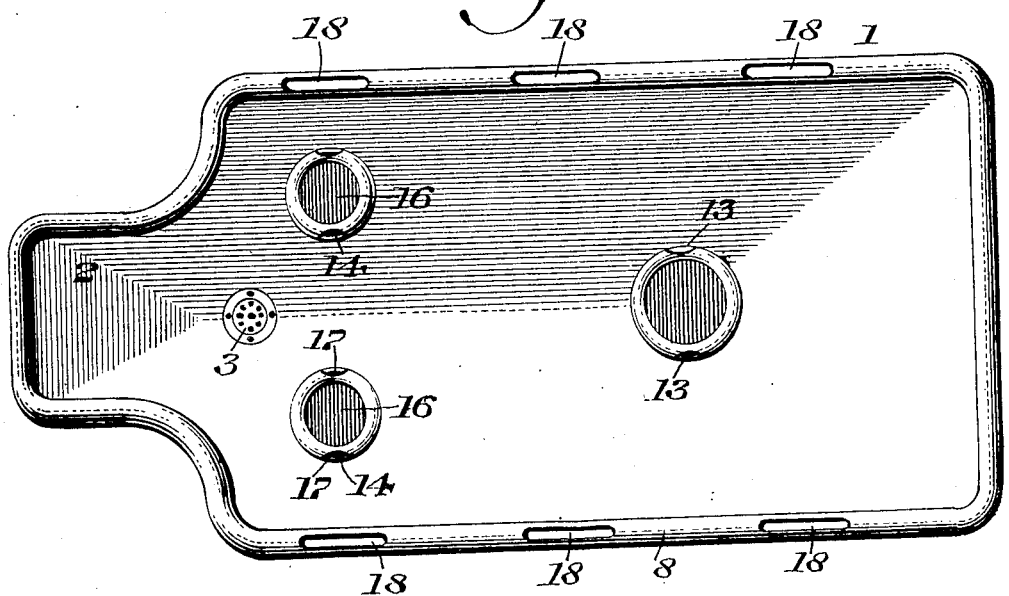
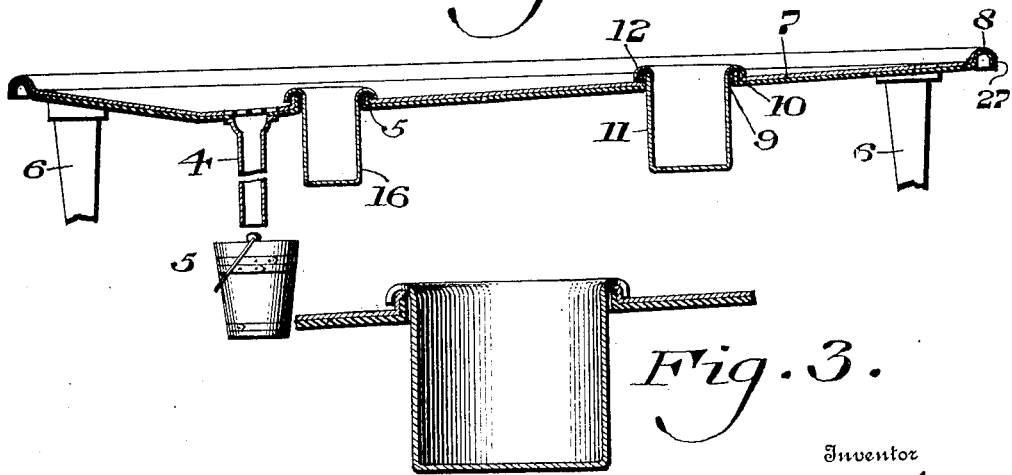
Witnesses
P. F. Nagle.
C. A. McVay.
Inventor
William B. Affleck.
By Diedersheim & Fairbanks
Attorneys

UNITED STATES PATENT OFFICE.

WILLIAM B. AFFLECK, OF PHILADELPHIA, PENNSYLVANIA.

TABLE FOR MEAT, SAUSAGE, AND THE LIKE.

No. 888,294.        Specification of Letters Patent.        Patented May 19, 1908.

Application filed May 28, 1907. Serial No. 376,210.

*To all whom it may concern:*

Be it known that I, WILLIAM B. AFFLECK, a citizen of the United States, and residing in the city and county of Philadelphia, State of Pennsylvania, have invented a new and useful Table for Meat, Sausage, and the Like, of which the following is a specification.

My invention relates to a new and useful table for meat, sausage and the like, and consists of forming the same of steel suitably enameled, and with removable receptacles connected therewith.

It further consists of other novel features of construction, all as will be hereinafter fully set forth.

Figure 1 represents a plan view of a meat or sausage table embodying my invention. Fig. 2 represents a sectional view showing the legs broken away. Fig. 3 represents a sectional view, on an enlarged scale, of one of the receptacles.

Similar numerals of reference indicate corresponding parts in the figures.

Referring to the drawings:—In the construction of tables now in use in packing houses, meat dealers, etc. the tables are usually constructed of wood, which absorbs the blood, etc. making the same unhealthy and the drains from these tables are usually connected by a pipe with the sewerage, whereby it is impossible to clean the pipe leading to the latter and thus the pipes become foul and unhealthy.

1 designates the meat or sausage table, preferably formed with the extension 2 and having an opening at a suitable point in its wall, said opening having the drain 3 suitably connected around the edge thereof and leading in said opening is a pipe 4 which extends down a suitable distance below the table and is adapted to discharge into a suitable pail or bucket 5. The table is supported upon suitable legs 6 and is formed of steel, the upper surface of which is enameled, as at 7, and the edges of said table being elevated and rounded as at 8, there being no angle formed between the raised portion and the bottom of the table, thus preventing the lodgment of any material.

9 designates an opening formed at a suitable point in the bottom of the table, having the upturned edge or flange 10 extending around the same, said opening being adapted to receive a receptacle 11 which is also provided with enamel. The vessel is provided with the turned over edges 12 between which and the bottom of the receptacle 11 the flange or upturned portion 10 is adapted to be seated, whereby it will be seen that said receptacle is firmly held in position, the upper edge of the receptacle being provided with a cut away portion 13 forming a means for engagement for removal and insertion of the receptacle.

14 designates other openings in the bottom of the table having upturned edges or flanges 15 similar to the portion 10, said openings being adapted to receive the receptacles 16 which are formed in a similar manner to the receptacle 11 and being also provided with the cut away portions 17. It will be noted that the bottom of the table slants from all directions to the drain pipe 4 so that the blood and other material will freely pass to said pipe and therefrom to said pail or receptacle 5. In the edges 8 of the table I provide slots or recesses 18 which are adapted for the reception of the operating knives and for the string used for tying the sausage casings after they are filled. The table just described is more particularly adapted for sausage, the receptacles 16 being adapted to receive the casings of the sausage from which the operator can remove them and after they are filled he can tie them by means of the string carried in the slots 18 and any material remaining over will be placed in the receptacle 11.

As there are no angles in the table the same can be thoroughly washed and cleansed as well as the receptacles, which can be removed by grasping the cut away portions 17. It will be seen by these means I have constructed a sanitary table which is practical in all particulars.

It will be understood that there are no angles in the same and that as the entire surface with which the material comes in contact is enameled the table can be kept thoroughly clean and sanitary.

It will be noted that the turn over portion 27 of the edges 8 of the table extend but a slight distance below the bottom of the table, the advantages of which are that the entire table can be thoroughly cleansed and the interior of the turn over edges 8 can be readily accessible to a scrubbing brush or other cleansing means.

Having thus described my invention, what I claim as new and desire to secure by Letters Patent, is:—

1. A table formed of steel having inclined bottom wall and suitably enameled, said bottom wall having openings therein and a plurality of independently removable receptacles adapted to be seated in said openings and having overturned edges, said table being provided with a drain, and said bottom wall inclining in all directions toward said drain.

2. A table formed of steel having inclined bottom wall and suitably enameled, said bottom wall having openings therein and a plurality of independently removable receptacles adapted to be seated in said openings and having overturned edges, said overturned edges being provided with cut-away portions, said table being provided with a drain, and said bottom wall inclining in all directions toward said drain.

3. A table for the purpose stated formed of metal suitably enameled and having a drain toward which the bottom wall of the table inclines from all directions, said bottom wall being provided with a plurality of openings and a table having a surrounding turned over edge elevated above the plane of the bottom and having slots therein, and independently removable vessels fitted to said openings and having cut-away portions at their upper ends.

WILLIAM B. AFFLECK.

Witnesses:
WM. CANER WIEDERSEIM,
JOHN A. WIEDERSHEIM.